(12) United States Patent
Caldwell

(10) Patent No.: US 8,120,335 B2
(45) Date of Patent: Feb. 21, 2012

(54) AVERAGE INDUCTOR CURRENT MODE SWITCHING CONVERTERS

(75) Inventor: Joshua William Caldwell, Santa Clara, CA (US)

(73) Assignee: Linear Technology Corporation, Milpitas, CA (US)

( * ) Notice: Subject to any disclaimer, the term of this patent is extended or adjusted under 35 U.S.C. 154(b) by 414 days.

(21) Appl. No.: 12/413,247

(22) Filed: Mar. 27, 2009

(65) Prior Publication Data

US 2010/0244793 A1 Sep. 30, 2010

(51) Int. Cl.
*G05F 1/613* (2006.01)
(52) U.S. Cl. .......................... 323/224; 323/283
(58) Field of Classification Search .................. 323/224, 323/283, 284
See application file for complete search history.

(56) References Cited

U.S. PATENT DOCUMENTS

| | | | |
|---|---|---|---|
| 5,731,694 A * | 3/1998 | Wilcox et al. ................. | 323/287 |
| 6,366,070 B1 * | 4/2002 | Cooke et al. .................. | 323/284 |
| 6,611,131 B2 | 8/2003 | Edwards | |
| 7,141,940 B2 | 11/2006 | Ortiz | |
| 7,180,274 B2 * | 2/2007 | Chen et al. .................... | 323/222 |
| 2004/0257055 A1 | 12/2004 | Aioanei | |
| 2004/0257056 A1 | 12/2004 | Huang et al. | |

OTHER PUBLICATIONS

European Search Report issued in European Patent Application No. 10158030.6-1242, dated Jul. 21, 2010.
Lloyd Dixon, "Average Current Mode Control of Switching Power Supplies," Unitrode Application Note U-140, 3-356.
K.D. Purton et al., "Average Current Mode Control in Power Electronic Converters—Analog Versus Digital."

* cited by examiner

*Primary Examiner* — Shawn Riley
(74) *Attorney, Agent, or Firm* — McDermott Will & Emery LLP

(57) ABSTRACT

An average current mode switching converter is described for providing a regulated output current independent of load conditions, and a regulated output voltage as a function of the load connected to the converter. The converter includes an inductor, a modulator, a feedback loop, and a precharger. The modulator is configured to provide a regulated current through the inductor The feed back loop is coupled between the inductor and the modulator for regulating the current through the inductor. The precharger is configured and arranged so as to provide and maintain a preset minimum current through the inductor independent of the load so as to improve the recovery time of the converter from a step in the desired regulated output current. Also disclosed is a method of providing a regulated output current independent of load conditions at the output of an average current mode switching converter, and a regulated output voltage as a function of the load connected to the output of converter. The method includes the steps of providing a regulated current through an inductor; and regulating the current through the inductor independent of the load so that a minimum current flows through the inductor so as to improve the recovery time of the converter from a step in the desired regulated output current.

29 Claims, 2 Drawing Sheets

US 8,120,335 B2

AVERAGE INDUCTOR CURRENT MODE SWITCHING CONVERTERS

BACKGROUND OF THE DISCLOSURE

Current mode switching converters are usually characterized by two control feedback loops, one for controlling the regulated output voltage and the other for controlling the output current. Current mode switching converters include those that sense and control peak current through an inductor, which gives rise to serious problems, including poor noise immunity, a need for slope compensation, and peak-to-average errors which the inherently low current loop gain cannot correct. Average current mode control eliminates these problems, or at least minimizes them. Average inductor current mode switching converters regulate the averaged current through the inductor to provide excellent inductor current regulation and noise immunity. Such switching converters also may be used effectively to control current other than inductor current, allowing a much broader range of topological applications.

A major drawback to average current mode regulation is that recovery can be slow from a step in the desired regulation current, usually encountered for example when going from a no load condition to a load condition. During a step response, the regulator must gradually slew the inductor current to its final regulated level. This is in contrast to a peak current-mode converter that will charge the inductor at nearly 100% duty-cycle until the desired peak inductor current level is achieved.

SUMMARY OF THE DISCLOSURE

An average current mode switching converter is described for providing a regulated output current independent of load conditions, and a regulated output voltage as a function of the load connected to the converter. The converter comprises: an inductor; a modulator configured to provide a regulated current through the inductor; a feed back loop coupled between the inductor and the modulator for regulating the current through the inductor; and a precharger configured and arranged so as to provide and maintain a preset minimum current through the inductor independent of the load so as to improve the recovery time of the converter from a step in the desired regulated output current.

Also disclosed is a method of providing a regulated output current independent of load conditions at the output of an average current mode switching converter, and a regulated output voltage as a function of the load connected to the output of converter. The method comprises: providing a regulated current through an inductor; and regulating the current through the inductor independent of the load so that a minimum current flows through the inductor so as to improve the recovery time of the converter from a step in the desired regulated output current.

GENERAL DESCRIPTION OF THE DRAWINGS

DETAILED DESCRIPTION OF THE DRAWINGS

Figure 1:
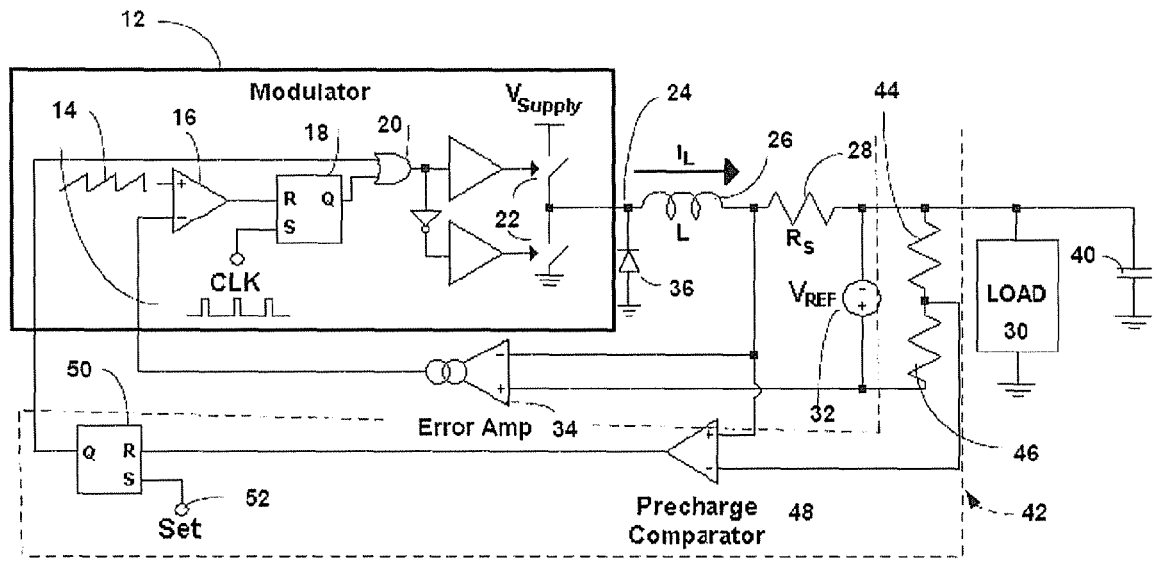
FIG. 1 shows one embodiment of an average current mode switching regulator provided with a precharger configured and arranged so as to provide and maintain a preset minimum current through the inductor independent of the load.

Referring to the drawings, the system for and method of providing switching regulation as illustrated in the Figs. have the advantages of providing peak current mode control in an average current mode control scheme. This is accomplished by allowing the inductor of the regulator to be effectively "precharged" to a known current level before normal switching and regulation commences.

FIG. 1 is one embodiment of the average current mode regulator. The regulator 10 includes a modulator 12. The latter comprises a timing circuit 14, which in turn can be any circuit suitable for producing in-phase ramp and clocking signals. The in-phase ramp signal is applied to the non-inverting input of the current comparator 16 which in turn has its output connected to the reset input of the RS latch 18. The clocking signal of the switching circuit is applied to the set input of the set input of the latch 18. As shown the Q output of latch 18 is applied to one input of the OR gate 20, with the output of the OR gate being applied to the switching circuit 22. As shown the switching circuit switches the output 24 of the modulator 12 between $V_{supply}$ and system ground. The output of the modulator is connected to one end of the inductor 26, with the other end of inductor 26 being connected to a sensing resistive element, shown as resistor 28. Resistor 28 is connected to the load 30.

A feed back path is provided by connecting the output of the modulator 12 to one side of a reference voltage source ($V_{REF}$) 32. The other side of the voltage source 32 is connected to the non-inverting input of the error amplifier 34, while the node between the inductor 26 and the resistor 28 is connected to the inverting input of the error amplifier 34. The output of the error amplifier is connected to the inverting input of the current comparator 16. Finally, a catch diode 36 is connected between the node 38 (between the output 24 of switching circuit 22 and the inductor 26) and ground, while a capacitor 40 is provided between the node (between the resistor 28 and 30) and ground.

A precharger, generally shown at 42 is configured and arranged so as to provide and maintain a preset minimum current through the inductor 26 independent of the load 30 so as to improve the recovery time of the converter from a step in the desired regulated output current. More specifically, in the embodiment shown in FIG. 1, a voltage proportional to the reference voltage $V_{REF}$ is created by resistor divider comprising resistors 44 and 46. The junction of the resistor divider (between resistors 44 and 46) is connected to the inverting input of the precharge comparator 48 so that a reference voltage proportional to $V_{REF}$ is applied. The junction between the inductor 26 and resistor 28 is connected to the non-inverting input of the precharge comparator 48. The output of precharge comparator 48 is connected to the R input of RS latch 50, with the Q output of latch 50 being connected to a second input of OR gate 20. A set input of latch 50 is provided at 52. The set input can be set in any manner, such as automatically, or by the user.

In operation, switch timing circuit 14 supplies a control signal that sets RS latch 18. While latch 18 is set, it provides a signal to the OR gate 20, so that the output of OR gate 20 provides a signal to the switching circuit 22 turning the switch on so that $V_{supply}$ is connected to the inductor 26 causing current to flow through inductor and the resistor 28. Latch 18 remains set until an output signal from comparator 16 causes latch 18 to reset. Ignoring for the moment the presence of the precharger, when reset, latch 18 turns switching circuit off so that the switching circuit 22 connects the output of the modulator to system ground.

Comparator 16 determines when to reset latch 18 by comparing a the current signal $I_L$ passing though the sensing resistor 28 (providing a voltage at the inverting input of the error amplifier 34. This voltage is compared to the reference voltage $V_{REF}$ from source 32 and applied to the non-inverting input of the error amplifier 34. Thus, the switching circuit 22 provides current pulses generated by the output of latch 18 that is applied to the OR gate 20, which in turn is used to turn the switching circuit 22 on and off. Passing though the inductor 26 and resistor 28, the current is converted into a substantially constant output current applied to the load 30.

The output of the regulator can be divided into two periods. The first is when the switching circuit 22 is ON, and the second is when the switching circuit 22 is OFF. During the ON period, current passes from $V_{supply}$ through the switching circuit 22 and flows through the inductor 26 and sensing resistor 28 to the output where it flows to the load 30. During this time the catch diode 38 is reversed biased. After the switching circuit 22 turns OFF, however, inductor 26 still has current flowing through it. The former current path through switching circuit 22 is now connected to ground, causing the voltage at output node 24 to drop such that the catch diode 38 becomes forward biased and starts to conduct. This maintains a closed current loop through the load. When the switching circuit turns on again, the voltage at the node rises such that the catch diode 38 becomes reverse-biased and again turns off. The cycle repeats itself.

By adding the precharger 42, the latter provides and maintains a preset minimum current through the inductor 26 independent of the load 30 so as to improve the recovery time of the converter from a step in the desired regulated output current.

Specifically, a signal is applied to the set input 52 of the latch 50 during no load conditions. This results in the latch turning on so long as the current through the resistor 28 is below the preset value which is determined by the ratio of the resistor divider. The RS latch 50 allows a single event to start the precharge state and cause the inductor to be charged at 100% duty cycle until the precharge comparator resets the latch. Specifically when the latch is on, the output of the latch is applied to OR gate 20. This results in the output of OR gate 20 turning the switching circuit 22 ON, thus allowing current to flow through the inductor and resistor 28. The resulting voltage is compared to the reference voltage established by the divider. When the voltage across the resistor 28 and applied to the non-inverting input of the precharge comparator exceeds the voltage established across the resistor divider, the output of the precharge comparator 48 resets RS latch 50. The precharge current will continue to flow through the feed back path including the error amplifier 34 so as to maintain the precharge current at the level established by the resistor divider of resistors 44 and 46.

Figure 2:
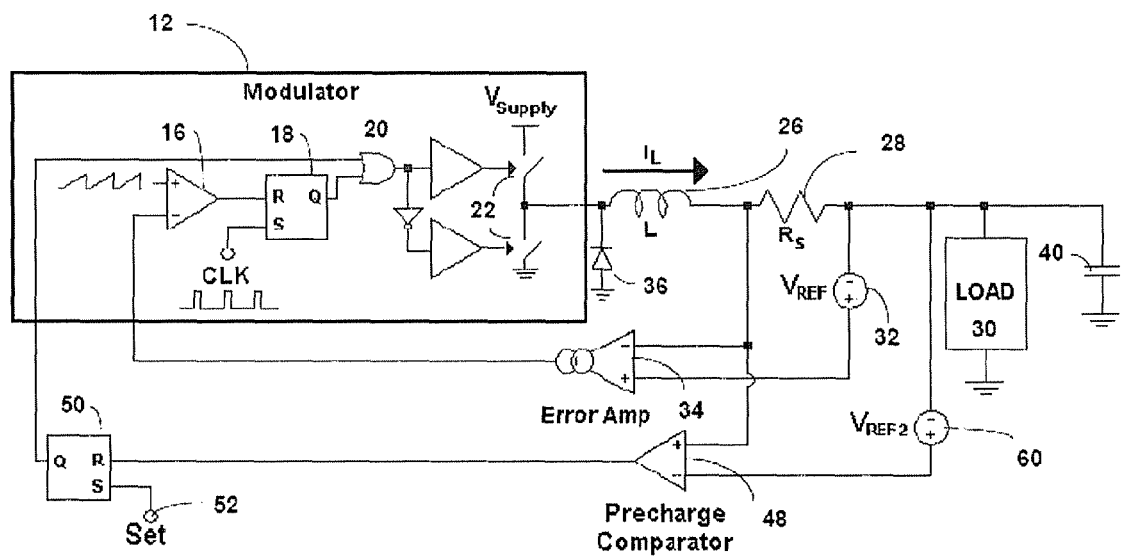
FIG. 2 shows a second embodiment of an average current mode switching regulator provided with a precharger configured and arranged so as to provide and maintain a preset minimum current through the inductor independent of the load.

It should be appreciated that the latch 50 can be eliminated by reconnecting the inputs of precharge comparator 48 so that the noninverting input is connected to the node between inductor 26 and resistor 28 and the inverting input is connected to the voltage divider formed by resistors 44 and 46. In this configuration, the current through inductor 26 and resistor 28 must create a voltage that is always greater than the reference voltage set by the resistor divider. Further, the current at which the inductor is precharged can be set at any level and does not have to be less than that determined by the reference level $V_{REF}$ as is the case in FIG. 1. As shown in FIG. 2, the resistor divider is replaced with a separate reference voltage supply $V_{REF2}$. $V_{REF2}$ this can be used to establish a precharge current any level, higher, equal to, or lower than $V_{REF}$ of FIG. 1.

With the addition of the precharger, the average current mode switching regulator has the dynamic response similar to a peak current mode control without the noise susceptibility.

Figure 3:
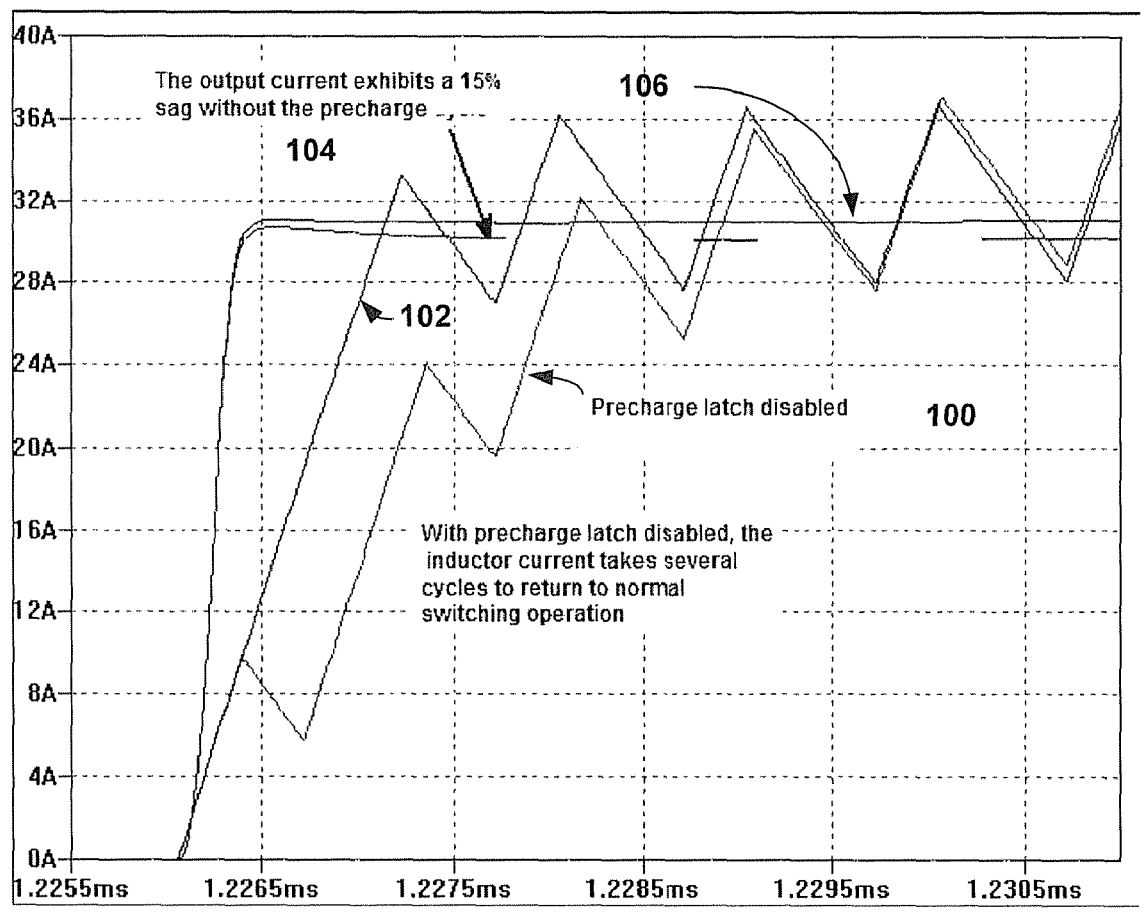
FIG. 3 is a simulated average current mode switching regulator current response with and without the inductor precharger.

FIG. 3 shows a simulated inductor current recovery from zero current with and without the precharge device. Curves 100 and 102 show the simulated current without and with the precharger, respectively, while curves 104 and 106 show the corresponding recovery of the output currents without and with the precharger device. It should be clear that the inductor current takes several cycles to achieve normal switching operation, and the output current exhibits an approximate 15% sag when the precharger device is absent, while the inductor current achieves normal switching operation within the first cycle of the modulator and the output current is more constant when a precharger device is employed.

While this disclosure has been particularly shown and described with references to preferred embodiments thereof, it will be understood by those skilled in the art that various changes in form and details may be made therein without departing from the spirit and scope of the disclosure as defined by the following claims.

What is claimed is:

1. An average current mode switching converter for providing a regulated output current independent of load conditions, and a regulated output voltage as a function of the load connected to the converter, comprising:
   an inductor;
   a modulator configured to provide a regulated current through the inductor;
   a feed back loop coupled between the inductor and the modulator for regulating the current through the inductor; and;
   a precharger configured and arranged so as to provide and maintain a preset minimum current through the inductor independent of the load so as to improve the recovery time of the converter from a step in the desired regulated output current,
   wherein the precharger includes (a) a sensing resistance element configured and arranged so as to conduct a current representative of the current flowing through the inductor, and (b) a second feed back loop comprising a comparator configured and arranged so as to (i) compare the voltage across the sensing resistance element with a second reference voltage and (ii) provide and maintain the current through the inductor at a minimum level as a function of the second reference voltage.

2. An average current mode switching converter according to claim 1, wherein the feedback loop further includes a latch having a (a) set input configured to receive a set input signal for enabling the precharger so that current is provided through the inductor if the current through the inductor is below the preset minimum current, and a reset input coupled to the output of the comparator so as to reset the latch should the current reach or exceed the preset minimum.

3. An average current mode switching converter according to claim 1, wherein the feed back loop includes an error amplifier configured to (i) measure the error between the voltage across the sensing resistor and a second reference voltage and (ii) provide an error signal to the modulator so that the current flowing through the inductor can be modified as a function of the error signal.

4. An average current mode switching converter according to claim 3, wherein the second reference voltage is independent of the first reference voltage.

5. An average current mode switching converter according to claim 3, wherein the second reference voltage is a function of the first reference voltage.

6. An average current mode switching converter according to claim 5, wherein second reference voltage is a fraction of the first reference voltage.

7. An average current mode switching converter according to claim 6, wherein the second reference voltage is provide by a resistor divider connected in parallel with the first reference divider.

8. A method of providing a regulated output current independent of load conditions at the output of an average current mode switching converter, and a regulated output voltage as a function of the load connected to the output of converter, comprising:
providing a regulated current through an inductor;
regulating the current through the inductor independent of the load so that a minimum current flows through the inductor so as to improve the recovery time of the converter from a step in the desired regulated output current; and
conducting through a sensing resistance element a current representative of the current flowing through the inductor, and (a) comparing the voltage across the sensing resistance element with a first reference voltage and (b) providing and maintaining the current through the inductor at a minimum level as a function of the first reference voltage.

9. A method according to claim 8, wherein regulating the current through the inductor includes providing and maintaining a preset minimum current through the inductor independent of the load so as to improve the recovery time of the converter from a step in the desired regulated output current.

10. A method according to claim 9, further comprising (a) applying a set input to a latch so that current is provided through the inductor if the current through the inductor is below a preset minimum current, and (b) resetting the input to the latch should the current reach or exceed the preset minimum.

11. A method according to claim 9, generating through a resistance element a current representative of the current flowing through the inductor, measuring the error between the voltage across the sensing resistor and a second reference voltage and providing an error signal so as to modify the current flowing through the inductor as a function of the error signal.

12. A method according to claim 11, further including comparing the voltage across the sensing resistance element with the first reference voltage and providing and maintaining the current through the inductor at a minimum level as a function of the first reference voltage.

13. A method according to claim 11, further including generating the first and second reference voltages are independent of one another.

14. A method according to claim 11, further including generating the first reference voltage as a function of the second reference voltage.

15. A method according to claim 14, further including generating the first reference voltage as a fraction of the second reference voltage.

16. A current mode switching converter comprising an inductor configured and arranged so as to provide current through the inductor to a load and a first feedback loop for regulating the current flowing through the inductor, the converter further comprising:
a precharger being configured and arranged so as to provide and maintain a preset minimum current through the inductor independent of the load so as to improve the recovery time of the converter from a step in the desired regulated output current, the precharger including (a) a sensing resistance element configured and arranged so as to conduct a current representative of the current flowing through the inductor, and (b) a second feed back loop comprising a comparator configured and arranged so as to (i) compare the voltage across the sensing resistance element with a first reference voltage and (ii) provide and maintain the current through the inductor at a minimum level as a function of the first reference voltage.

17. A current mode switching converter according to claim 16, wherein the first feed back loop includes an error amplifier configured to (i) measure the error between the voltage across the sensing resistor and a second reference voltage and (ii) provide an error signal to the modulator so that the current flowing through the inductor can be modified as a function of the error signal.

18. A current mode switching converter according to claim 17, wherein the second reference voltage is independent of the first reference voltage.

19. A current mode switching converter according to claim 17, wherein the second reference voltage is a function of the first reference voltage.

20. A current mode switching converter according to claim 17, wherein second reference voltage is a fraction of the first reference voltage.

21. A current mode switching converter according to claim 17, wherein the second reference voltage is provided by a resistor divider connected in parallel with the first reference divider.

22. A current mode switching converter according to claim 16, wherein the converter is configured and arranged as an average current mode switching converter.

23. A current mode switching converter comprising an inductor configured and arranged so as to provide current through the inductor to a load, the converter further comprising:
a first control feed back loop for regulating the current through the inductor; and
a precharger including (a) a sensing resistance element configured and arranged so as to conduct a current representative of the current flowing through the inductor, and (b) a second control feed back loop comprising a comparator configured and arranged so as to (i) compare the voltage across the sensing resistance element with a first reference voltage and (ii) precharge the current through the inductor to a minimum level as a function of the first reference voltage.

24. A current mode switching converter according to claim 23, wherein the first feed back loop includes an error amplifier configured to (i) measure the error between the voltage across the sensing resistor and a second reference voltage and (ii) provide an error signal to the modulator so that the current flowing through the inductor can be modified as a function of the error signal.

25. A current mode switching converter according to claim 24, wherein the second reference voltage is independent of the first reference voltage.

26. A current mode switching converter according to claim 24, wherein the second reference voltage is a function of the first reference voltage.

27. A current mode switching converter according to claim 24, wherein second reference voltage is a fraction of the first reference voltage.

28. A current mode switching converter according to claim 24, wherein the second reference voltage is provide by a resistor divider connected in parallel with the first reference divider.

29. A current mode switching converter according to claim 23, wherein the converter is configured and arranged as an average current mode switching converter.

* * * * *